US009007612B2

(12) United States Patent
Gaertner et al.

(10) Patent No.: US 9,007,612 B2
(45) Date of Patent: Apr. 14, 2015

(54) INSERTION OF PRINTER OPERATOR INSTRUCTIONS ONTO SEPARATOR PAGES IN A PRINT SHOP ENVIRONMENT

(75) Inventors: Joseph P. Gaertner, Lafayette, CO (US); Joan Stagaman Goddard, Boulder, CO (US); Kumar V. Kadiyala, Boulder, CO (US); Marquis G. Waller, Beverly, OH (US)

(73) Assignee: Ricoh Company, Ltd., Tokyo (JP)

( * ) Notice: Subject to any disclaimer, the term of this patent is extended or adjusted under 35 U.S.C. 154(b) by 594 days.

(21) Appl. No.: 13/011,043

(22) Filed: Jan. 21, 2011

(65) Prior Publication Data

US 2012/0188580 A1   Jul. 26, 2012

(51) Int. Cl.
*G06K 15/00*   (2006.01)
*G06F 3/12*   (2006.01)

(52) U.S. Cl.
CPC .............. *G06F 3/1203* (2013.01); *G06F 3/121* (2013.01); *G06F 3/1234* (2013.01); *G06F 3/1264* (2013.01); *G06F 3/1282* (2013.01); *G06F 3/1288* (2013.01)

(58) Field of Classification Search
None
See application file for complete search history.

(56) References Cited

U.S. PATENT DOCUMENTS

| 7,184,154 | B1 * | 2/2007 | Housel ................... 358/1.13 |
| 2002/0089689 | A1 * | 7/2002 | Ferlitsch et al. ........... 358/1.15 |
| 2003/0020944 | A1 * | 1/2003 | Bhogal et al. ............. 358/1.15 |
| 2004/0008363 | A1 * | 1/2004 | Suzuki et al. ............. 358/1.14 |

* cited by examiner

*Primary Examiner* — Saeid Ebrahimi Dehkordy
*Assistant Examiner* — Lennin Rodriguezgonzale
(74) *Attorney, Agent, or Firm* — Duft Bornsen & Fettig LLP (57) ABSTRACT

Systems and methods are provided for notifying operators of tasks to perform on printers by inserting operator instructions onto separator pages that are placed between print jobs. One embodiment is a print server that includes a control system and a page generator. The control system is operable to identify a print job, and to identify an operator instruction for the print job indicating a physical task for an operator to perform on a printer before the print job is printed. Also, the control system holds the print job responsive to identifying the operator instruction. The page generator generates a separator page comprising the operator instruction that indicates the physical task to perform on the printer, and transmits the separator page for printing to inform the operator of the task before the print job is printed.

20 Claims, 6 Drawing Sheets

INSERTION OF PRINTER OPERATOR INSTRUCTIONS ONTO SEPARATOR PAGES IN A PRINT SHOP ENVIRONMENT

FIELD OF THE INVENTION

The invention relates to the field of printing, and in particular to instructing printer operators in print shop environments.

BACKGROUND

Print shops are typically medium or large scale facilities capable of supplying printing services to meet a variety of customer demands. For example, print shops are often used to print documents used for mass-mailing (e.g., customer bills, advertisements, etc). Because print shops engage in printing on a scale that is hard to match, their customer base is usually varied. Print shop clients may therefore include both large institutional clients (e.g., credit card companies and banks), and small clients (e.g., small businesses and churches).

Print shops are generally arranged to print incoming jobs from clients in a way that is economical, yet fast. Thus, print shops often include a number of high-volume printers capable of printing incoming jobs quickly and at high quality. Print shops also typically include post-processing devices that are used to process the printed documents of each job (e.g., stackers, staplers, cutters, binders, etc.). Because print shops serve a variety of clients, they are often tasked with printing jobs that have varying printing formats, delivery dates, and media requirements. Print shops therefore often use a centralized print server that coordinates activity between printers of the print shop and clients. The print server schedules incoming jobs and forwards them to the printers they are directed to.

The printers of a print shop may be managed by operators who setup printers, oversee print jobs, remove paper jams, stack or cut printed pages of print jobs, or move printed documents of print jobs to various locations within the print shop. These activities may be performed while the printer is still printing jobs from the print server. As the printer is printing, it may be desired to perform tasks on the printer such as loading it with media or ink. However, a printer operator's activities prevent them from constantly monitoring the printer.

Printer operators therefore desire to be informed of upcoming tasks to be performed on a printer while they are engaged in their daily activities. Tasks to be performed may include loading the printer with media or ink, or calibrating a printer before a print job is printed. If a printer is not set up correctly, it may print the documents of a print job using the wrong media or ink. If documents are printed improperly, time and resources are wasted because the print job will be re-printed.

SUMMARY

Embodiments described herein identify operator instructions for a printer that relate to incoming print jobs, and provide these instructions to printer operators. Printer operators may then execute the tasks indicated by the operator instructions to ensure that incoming jobs are printed correctly. Operator instructions may be provided with printed separator pages (printed pages used to separate physical printed documents), or may be provided at a user interface. Thus, a printer operator is informed of tasks to perform on the printer even though they may be unable to continuously monitor it.

One embodiment includes a print server operable to insert operator instructions onto separator pages. The print server includes a control system and a page generator. The control system is operable to identify a print job, and to identify an operator instruction for the print job indicating a physical task for an operator to perform on a printer before the print job is printed. Also, the control system holds the print job responsive to identifying the operator instruction. The page generator generates a separator page comprising the operator instruction that indicates the physical task to perform on the printer, and transmits the separator page for printing to inform the operator of the task.

Another embodiment comprises a print server for displaying operator instructions. The print server comprises a control system, a display generator, and a user interface. The control system is operable to identify a print job, to identify an operator instruction for the print job indicating a physical task for an operator to perform on a printer before the print job is printed, and to hold the print job responsive to identifying the operator instruction. The display generator is operable to generate a display comprising the operator instruction, and to transmit the display. The user interface is operable to receive the transmitted display and to present the display to inform an operator of the physical task to be performed.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
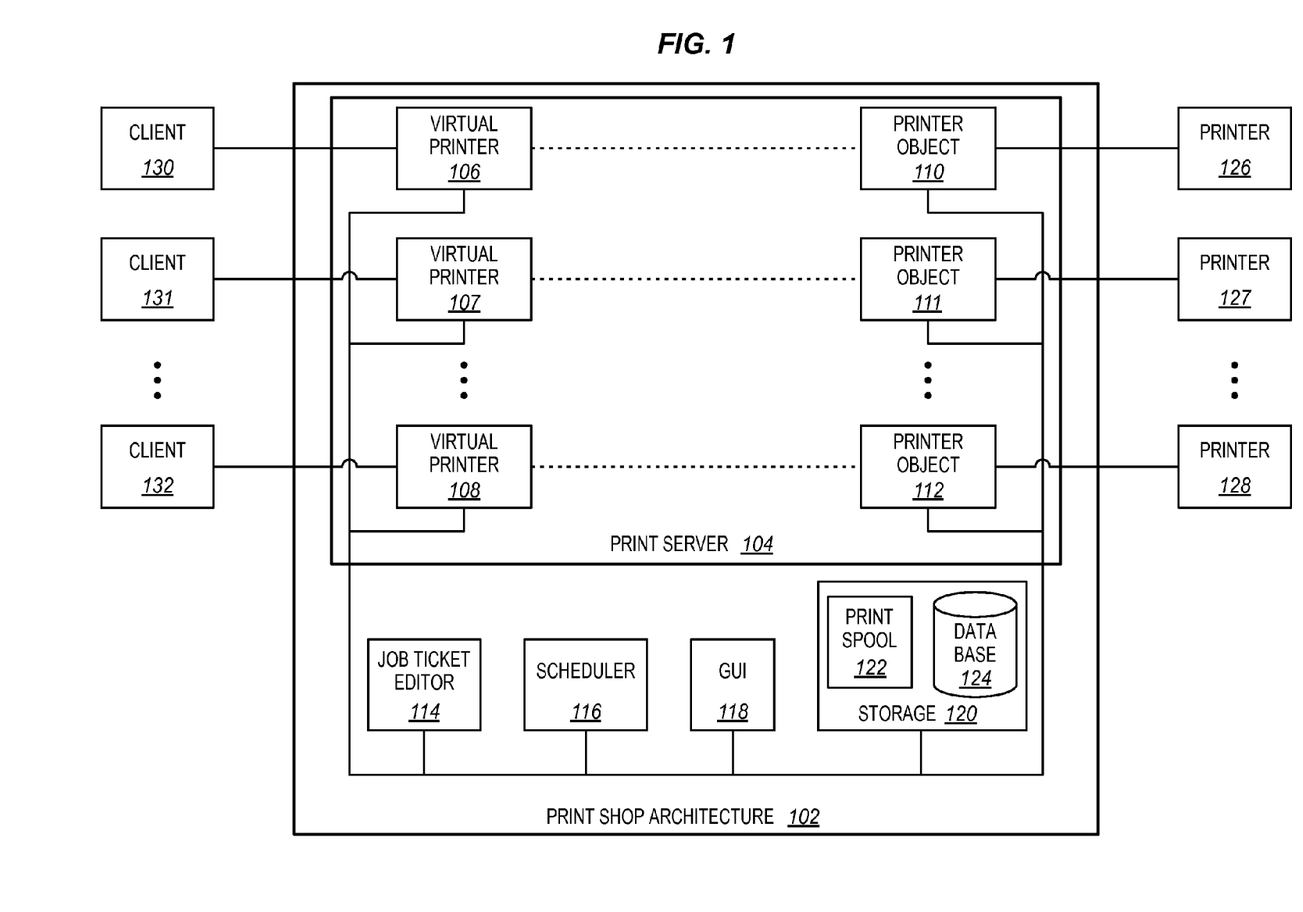
FIG. 1 is a block diagram illustrating a print shop architecture in an exemplary embodiment.

FIG. 1 is a block diagram illustrating a print shop architecture 102 in an exemplary embodiment. Print shop architecture 102 couples one or more clients 130-132 to one or more printers 126-128 to provide printing and print workflow services to clients 130-132. Print shop architecture 102 is operable to receive print jobs and job tickets from clients 130-132 for printing on printers 126-128. Clients 130-132 may include banks, credit card companies, or other entities with printing needs (e.g., monthly bank statements, monthly credit card bills, etc.). Print shop architecture 102 may receive print jobs from clients 130-132 in a number of different formats, such as Portable Document Format (PDF), Mixed Object: Document Content Architecture (MO:DCA), etc. Job tickets may be received from clients 130-132 in a number of different formats, such as Job Definition Format (JDF), Print Production Format (PPF), Portable Job Ticket Format (PJTF), etc. Printers 126-128 generally include systems for transforming print data onto a suitable printable medium, such as paper, and generally are large production printing systems for high volume printing.

Print shop architecture 102 includes a print server 104 having one or more virtual printers 106-108. Virtual printers 106-108 communicate with clients 130-132 and provide an interface similar to a printer driver to allow clients 130-132 to set up print jobs and send print jobs (and job tickets associated with the print jobs) to print shop architecture 102. When clients 130-132 send print jobs and job tickets to print shop architecture 102, the job tickets are scanned into a database 124 located in storage 120 of print shop architecture 102. The print jobs are then stored in a print spool 122 of storage 120 as open jobs prior to queuing the print jobs for printing. A scheduler 116 identifies the open jobs located in print spool 122 and attempts to schedule the jobs at a queue of one or more printer objects 110-112. Typically, scheduler 116 attempts to schedule the open jobs at one of printer objects 110-112 corresponding with virtual printers 106-108 that received the print job. For example, if client 130 transmitted the print job to virtual printer 106, then scheduler 116 may first attempt to place the print job at a print queue of printer object 110. Generally, printer objects 110-112 interface with corresponding printers 126-128 to queue and process print jobs prior to transmitting the jobs to printers 126-128.

A printer operator may use a user interface of print shop architecture 102 to control and identify the status of jobs at print shop architecture 102. For example, user interface 118 may provide a list of print jobs in queues of printer objects 110-112 and other general information about the status of open jobs in print spool 122.

The printer operator may also use a job ticket editor 114 to modify job tickets associated with both open and queued print jobs. Using job ticket editor 114, the printer operator may modify job tickets to change various print options for a print job associated with the job ticket, such as duplexing, stapling, media type, etc.

Print shop architecture 102 provides a number of printing and workflow services to clients 130-132 which will become more readily apparent through the following discussion and related figures. FIGS. 2-6 will discuss embodiments of print shop architectures that are able to identify instructions relating to a print job and provide them to a printer operator via a printed separator page or user interface.

Figure 2:
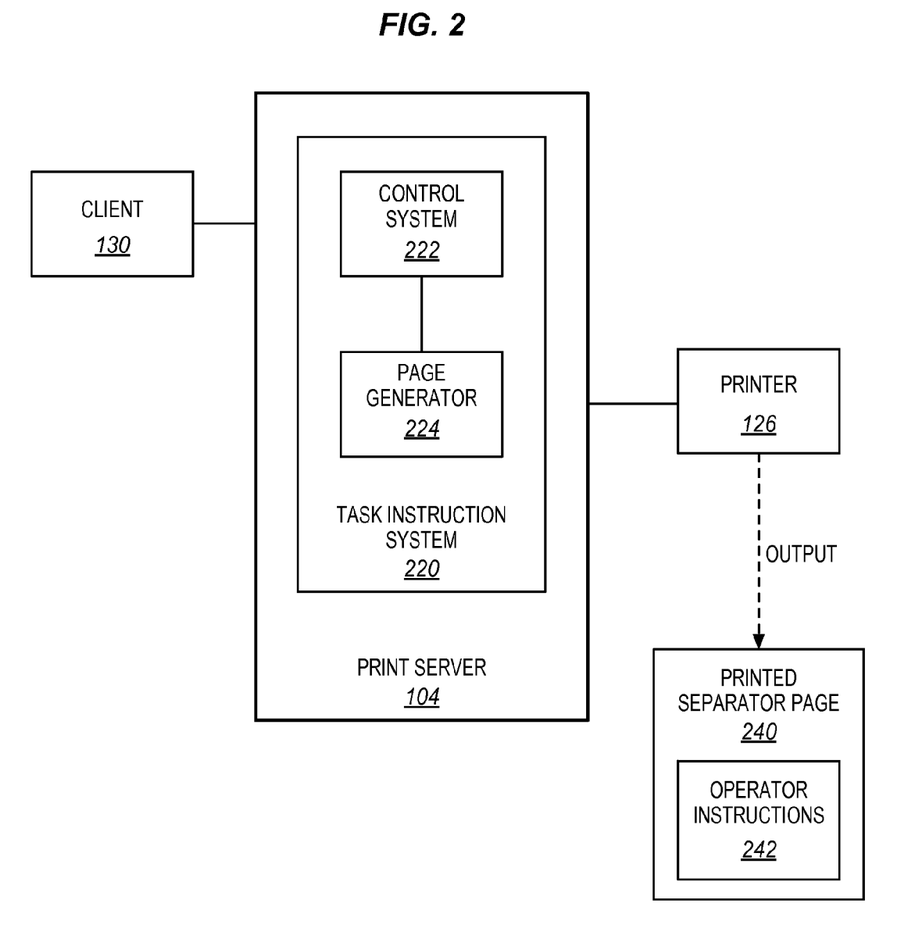
FIG. 2 is a block diagram including a task instruction system in an exemplary embodiment.

FIG. 2 is a block diagram including a task instruction system 220 in an exemplary embodiment. Task instruction system 220 is implemented in print server 104, but could be implemented in other systems or devices. Task instruction system 220 is operable to identify print jobs from client 130 and identify operator instructions related to the print jobs. Task instruction system 220 is also operable to direct printer 126 to display operator instructions on printed separator pages. By sending instructions to operators via printed separator pages, task instruction system 220 ensures that operators remain informed of physical tasks to perform in the print shop. Printer operators may then configure printers so that incoming print jobs are properly printed.

In this embodiment, task instruction system 220 includes a control system 222 and a page generator 224. Control system 222 comprises any system, device, or component operable to process print jobs and operator instructions. Operator instructions indicate physical tasks to be performed on a printer, which may include adjusting physical settings of printer 126 (e.g., altering the print quality and/or speed of printer 126), calibrating printer 126 (e.g., aligning or cleaning print heads of printer 126), loading printer 126 with media or ink, replacing the stacker of printer 126 (stackers are typically storage devices that hold or sort printed pages of a print job), carrying out post-processing operations on printed documents, etc. Page generator 224 comprises any system, device, or component operable to generate a separator page that includes an operator instruction.

When in operation, print server 104 receives print jobs from clients 130-132. Print server 104 queues these incoming print jobs at printer objects 110-112 for printing from printers 126-128. At this point, task instruction system 220 may process the print jobs at printer objects 110-112 to identify operator instructions related to each job, and to direct printer 126 to create printed separator page 240 having operator instructions 242.

Figure 3:
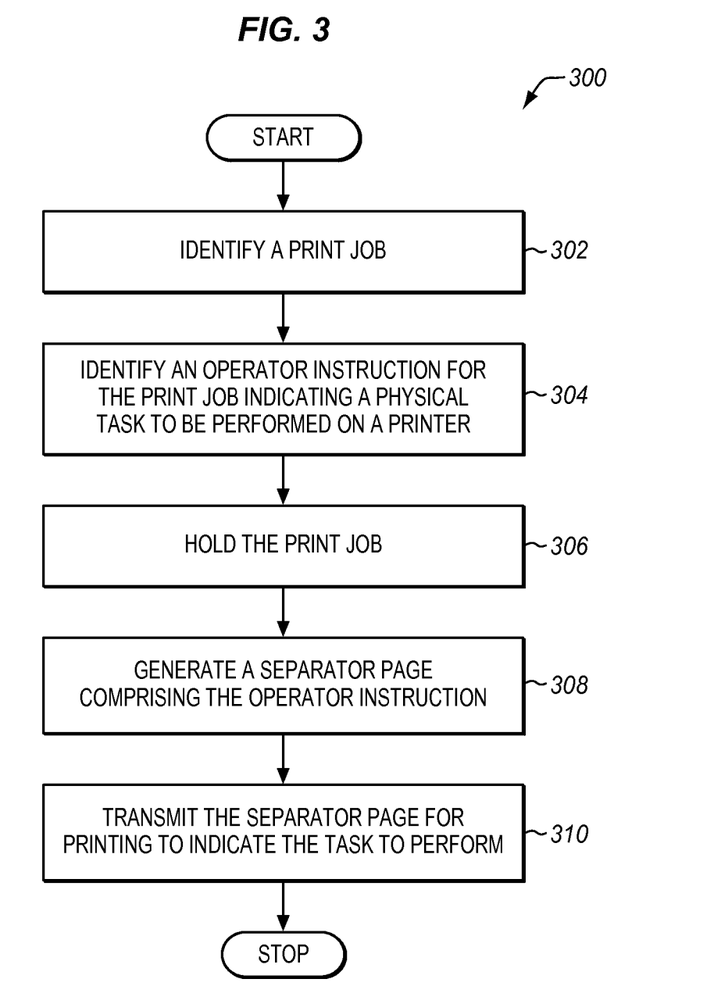
FIG. 3 is a flowchart illustrating a method for inserting operator instructions onto separator pages in an exemplary embodiment.

FIG. 3 is a flowchart illustrating a method 300 for inserting operator instructions onto separator pages in an exemplary embodiment. The steps of method 300 are described with reference to task instruction system 220 of FIG. 2, but those skilled in the art will appreciate that method 300 may be performed in other systems. The steps of the flowcharts described herein are not all inclusive and may include other steps not shown. The steps described herein may also be performed in an alternative order.

At step 302, control system 222 identifies a print job. Any print job may be identified within a printing queue of printer 126. Print jobs may be identified, for example, by an index number associated with the print job.

At step 304, control system 222 identifies one or more operator instructions for the print job indicating a physical task to be performed on printer 126 before the print job is printed. In one embodiment, control system 222 identifies an operator instruction by reading input from user interface 118 that specifies a task to be performed. In another embodiment, control system 222 identifies an operator instruction by analyzing the properties of incoming print jobs and comparing them to the current configuration of printer 126. For example, control system 222 may identify the number of pages in a print job, and may also identify the number of pages loaded in printer 126. Control system 222 may then determine that there are fewer pages loaded in the printer than are used for the print job. Thus, control system 222 determines that this difference between the properties of the print job and the configuration of printer 126 could keep the print job from printing correctly, and generates an operator instruction to load printer 126 with more paper, based upon this difference.

At step 306, control system 222 holds the print job in response to identifying an operator instruction. Holding a print job is desirable because it prevents the print job from printing on printer 126 when the printer is not properly configured to print the job. Holding the print job does not necessarily stop all printing on printer 126. Instead, printer 126 can continue printing jobs that are not affected by the instruction (e.g., if an operator instruction indicated that red paper should be loaded, jobs that did not use red paper could still be printed on printer 126 regardless of whether the task was performed).

At step 308, page generator 224 generates a separator page comprising the operator instruction indicating the task to be performed on printer 126. The operator instruction may be generated within the separator page as a textual or graphical element. In one embodiment, page generator 224 generates the operator instruction so that it is accompanied by a special graphic (e.g., an exclamation point or a print shop letterhead) indicating the nature of the task. In another embodiment, page generator 224 indicates that the separator page should be printed on media with a different color or size than the print jobs it will be placed before or after. Altering the way that operator instructions are displayed on a printed separator page helps an operator to identify and categorize incoming instructions.

At step 310, page generator 224 transmits the separator page for printing. The separator page may be transmitted just before the print job it relates to, or may be transmitted with other print jobs that will be printed earlier. Transmitting the separator page with earlier print jobs may give a printer operator more time to perform a physical task on printer 126.

Generally, page generator 224 transmits the separator page to printer 126. However, printer 126 may be unavailable to print the separator page (e.g., printer 126 may encounter a paper jam). Here, page generator 224 transmits the separator page to printer 127 for printing. In this case, the operator instructions in the transmitted separator page direct the printer operator to perform the task on printer 126.

Printer 126 receives the separator page and prints printed separator page 240, which includes operator instructions 242. The printer operator, informed of the physical task, may then complete the task. Once the task indicated by the operator instruction on printed separator page 240 has been performed, control system 222 may receive a confirmation that the task has been performed. The printer operator may provide the confirmation, or printer 126 may provide the confirmation after detecting successful completion of the task. For example, printer 126 may detect that it has been loaded with new media or ink (as required by an operator instruction) and send a confirmation to control system 222.

Control system 222 may then release the held print job responsive to receiving the confirmation, allowing printer 126 to print the print job. Thus, according to the embodiments described above, operator instructions are identified that relate to incoming print jobs, and these instructions are provided to printer operators. Printer operators are then informed of tasks to perform (even though they may be continuously monitoring the printer), and may then execute the tasks indicated by the operator instructions to ensure that incoming jobs are printed correctly. At the same time, print jobs related to the operator instructions are held so that they are not sent for printing until the printer is properly configured.

Additional features will now be described in an example of inserting operator instructions onto a separator page. In this example, control system 222 is incorporated into virtual printer 106. Client 130 provides a print job to control system 222. Control system 222 parses properties of the print job to determine the type of media that the print job uses. Next, control system 222 queries printer 126, and determines that the trays of printer 126 are loaded with a different type of media than used by the print job. Control system 222 determines, based on the report, that printer 126 lacks the media desired by the print job. Thus, control system 222 generates an operator instruction indicating that media for the print job should be loaded onto printer 126 before the print job is printed.

Control system 222 assigns the operator instruction to the print job by associating an index number of the print job with the operator instruction, and holds the print job from being printed. The operator instruction assigned to the print job is then viewed whenever a user selects the print job via user interface 118. Page generator 224 receives the operator instruction from control system 222 and generates a separator page with the operator instruction indicating that the printer should be loaded with new media. Page generator 224 transmits the separator page to printer 126. Printer 126 creates printed separator page 240 having operator instructions 242. Printed separator page 240 uniquely distinguishes itself from print jobs on printer 126 by having a paper size, paper color, ink color, graphic or watermark that is distinct from the pages of these print jobs.

A printer operator receives printed separator page 240, identifies the operator instruction indicating that printer 126 is to be loaded with new media, and loads printer 126 with the media. Printer 126 uses internal sensors to detect that it has been loaded with the appropriate media, and reports that the task has been performed. Upon receiving confirmation that the task specified by the operator instruction has been performed, control system 222 releases the held print job. Control system 222 releases the held print job by adding the print job to a queue for printer 126, and then transmitting the print job to printer 126. As an alternative, task instruction system 220 may generate a display that comprises the instruction, and display it to the printer operator via user interface 118. Additional exemplary details of this alternative will be described below with regard to FIG. 4.

Figure 4:
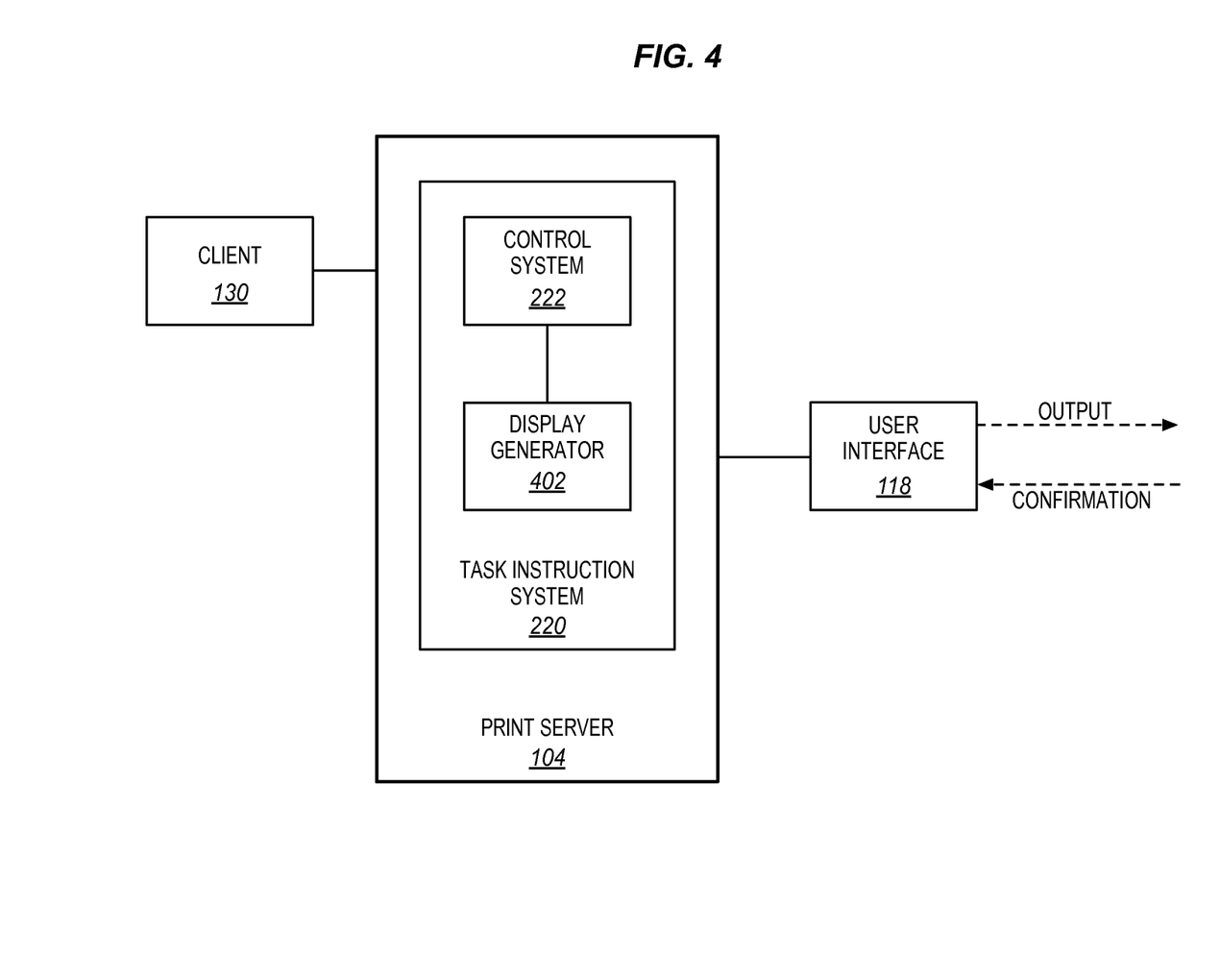
FIG. 4 is a block diagram of a task instruction system that includes a display generator in an exemplary embodiment.

FIG. 4 is a block diagram of a task instruction system 220 that includes a display generator 402 in an exemplary embodiment. Display generator 402 creates displays that include operator instructions, and transmits these displays to user interface 118. User interface 118 comprises any system, component, or device operable to receive displays and present them to a user. Further, user interface 118 is operable to receive a confirmation that an operator has completed a task. Further details of the operation of user interface 118 will be discussed with regard to FIG. 5.

Figure 5:
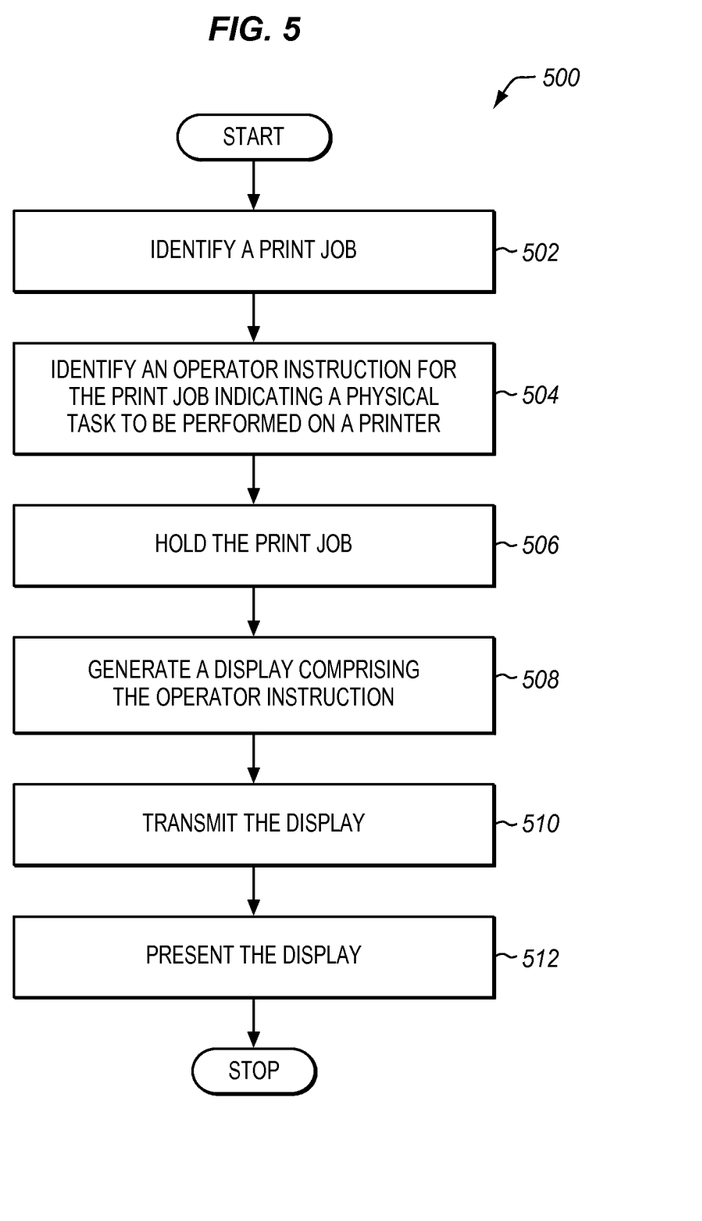
FIG. 5 is a flowchart illustrating a method for displaying operator instructions at a user interface in an exemplary embodiment.

FIG. 5 is a flowchart illustrating a method 500 for displaying operator instructions at a user interface 118 in an exemplary embodiment. The steps of method 500 are described with reference to task instruction system 220 of FIG. 2 and user interface 118 of FIG. 4, but those skilled in the art will appreciate that method 500 may be performed in other systems.

Steps 502-506 of method 500 may be performed in a similar fashion to steps 302-306 of method 300 described above. At step 502, task instruction system 220 identifies a print job. Task instruction system 220 identifies an operator instruction for the print job indicating a task to be performed on a printer at step 504. At step 506, task instruction system 220 holds the print job, and at step 508, display generator 402 generates a display that includes the operator instruction. Display generator 402 transmits the display to user interface 118 at step 510, and at step 512 the display is presented at user interface 118 as a notification to a printer operator. User interface 118 may display the operator instruction as a graphic element, a textual element, or any combination thereof. Furthermore, the graphics displayed at user interface 118 may indicate the nature or urgency of the task to be performed. In addition to displaying the operator instruction, user interface 118 provides a dialog allowing the user to indicate that they have successfully completed the task. This dialog may be a simple check-box or button, or may include multiple parameters allowing an operator to indicate how the task was completed (e.g., the number of sheets of paper that have been loaded into the printer, size of the paper, etc.).

In one embodiment, control system 222 stores print jobs in a printing queue that may be accessed by user interface 118. Control system 222 associates print jobs of the queue with related operator instructions. Control system 222 then displays the associated operator instruction to a user whenever a print job is selected for viewing via user interface 118.

Figure 6:
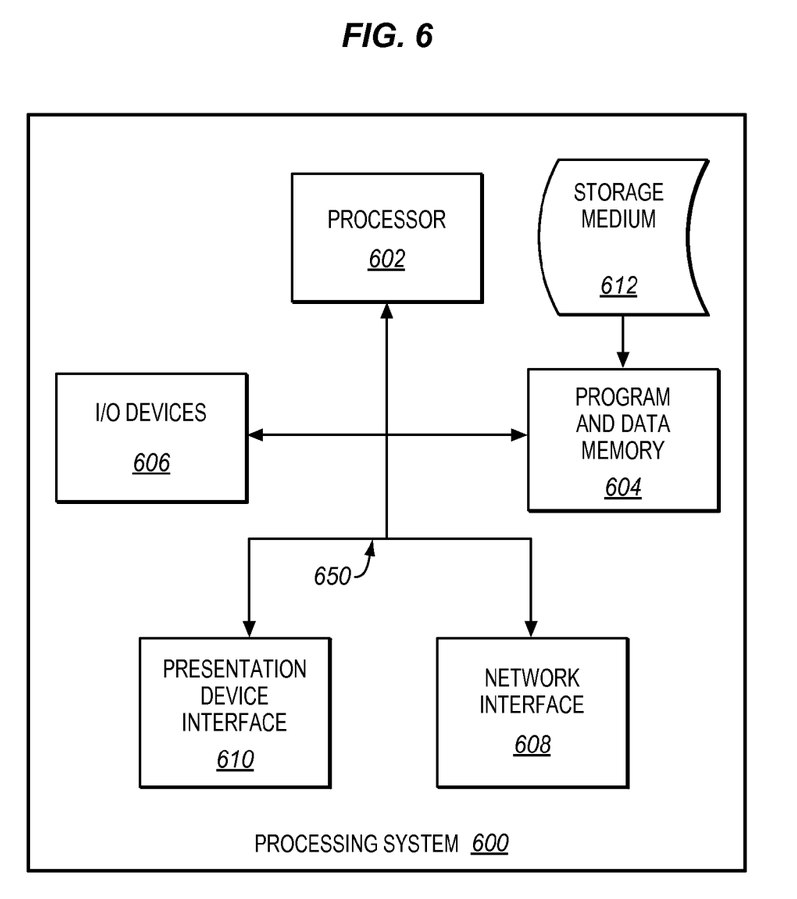
FIG. 6 illustrates a computer system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of task instruction system 220 to perform the various operations disclosed herein. FIG. 6 is a block diagram depicting a processing system 600 that is operable to perform the above operations by executing programmed instructions tangibly embodied computer readable storage medium 612. In this regard, embodiments of the invention can take the form of a computer program accessible via the computer readable storage medium 612 providing program code for use by a computer or any other instruction execution system. For the purposes of this description, a computer readable storage medium 612 can be anything that can contain or store the program for use by the computer.

The computer readable storage medium 612 can be an electronic, magnetic, optical, electromagnetic, infrared, or semiconductor device. Examples of the computer readable storage medium 612 include a solid state memory, a magnetic tape, a removable computer diskette, a random access memory (RAM), a read-only memory (ROM), a rigid magnetic disk, and an optical disk. Current examples of optical disks include compactdisk -read only memory (CD-ROM), compact disk-read/write (CD-R/W), and DVD.

The processing system 600, being suitable for storing and/or executing the program code, includes at least one processor 602 coupled to memory elements 604 through a system bus 650. The memory elements 604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 606 (including but not limited to keyboards, displays, pointing devices, etc) can be coupled to the system either directly or through intervening I/O controllers. Network adapter interfaces 608 may also be coupled to the system to enable the computer system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 610 may be coupled to the system to interface to one or more presentation devices, such as printing systems and displays for presentation of presentation data generated by processor 602.

Although specific embodiments were described herein, the scope of the invention is not limited to those specific embodiments. The scope of the invention is defined by the following claims and any equivalents thereof.

We claim:

1. A print server comprising:
a control system that identifies a print job, identifies an operator instruction for the print job indicating a physical task for an operator to perform on a printer before the print job is printed, and holds the print job while allowing the printer to continue printing other print jobs that are unaffected by the operator instruction, responsive to identifying the operator instruction; and
a page generator that generates a separator page comprising the operator instruction indicating the physical task to perform on the printer,
wherein in response to the print server determining that the printer is unavailable for printing the separator page, the page generator transmits the separator page to another printer for printing before the print job is released for printing.

2. The print server of claim 1 wherein:
the control system receives a confirmation that the task has been performed on the printer, and releases the held print job responsive to receiving the confirmation that the task has been performed on the printer.

3. The print server of claim 1 wherein:
the print server determines that the printer is unavailable when it detects that the printer has encountered a paper jam.

4. The print server of claim 1 wherein:
the control system identifies the operator instruction by identifying properties of the print job, identifying a configuration of the printer, determining that there is a difference between the properties of the print job and the configuration of the printer that will prevent the print job from printing correctly, and generating an operator instruction based upon this difference.

5. The print server of claim 1 wherein the separator page has at least one of a page size, page color, marking ink, font size, typeface, or graphic that is different from the print job.

6. The print server of claim 1, wherein:
the operator instruction is included on the separator page as a graphical element.

7. The print server of claim 1, wherein:
the operator instruction is included on the separator page as a textual element.

8. A method comprising:
identifying a print job;
identifying an operator instruction for the print job indicating a physical task to perform on a printer before the print job is printed;
holding the print job while allowing the printer to continue printing other print jobs that are unaffected by the operator instruction, responsive to identifying the operator instruction;
generating a separator page comprising the operator instruction indicating the physical task to perform on the printer; and
transmitting the separator page to another printer for printing before the print job is released for printing, in response to determining that the printer is unavailable for printing the separator page.

9. The method of claim 8 further comprising:
receiving confirmation that the task has been performed on the printer;
releasing the held print job responsive to receiving the confirmation that the task has been performed on the printer; and
transmitting the print job to the printer responsive to releasing the print job for printing.

10. The method of claim 8 further comprising:
determining that the printer is unavailable by detecting that the printer has encountered a paper jam.

11. The method of claim 8 further comprising identifying the operator instruction by:
identifying properties of the print job;
identifying a configuration of the printer;

determining that there is a difference between the properties of the print job and the configuration of the printer that will prevent the print job from printing correctly; and generating an operator instruction based upon this difference.

12. The method of claim 8 wherein the separator page has at least one of a page size, page color, marking ink, font size, typeface, or graphic that is different from the print job.

13. The method of claim 8, wherein:
the operator instruction is included on the separator page as a graphical element.

14. The method of claim 8, wherein:
the operator instruction is included on the separator page as a textual element.

15. A non-transitory computer readable medium embodying programmed instructions which, when executed by a processor, are operable for performing a method of instructing printer operators, the method comprising:
identifying a print job;
identifying an operator instruction for the print job indicating a physical task to perform on a printer before the print job is printed;
holding the print job while allowing the printer to continue printing other print jobs that are unaffected by the operator instruction, responsive to identifying the operator instruction;
generating a separator page comprising the operator instruction indicating the physical task to perform on the printer; and
transmitting the separator page to another printer for printing before the print job is released for printing, in response to determining that the printer is unavailable for printing the separator page.

16. The computer readable medium of claim 15, wherein the method further comprises:
receiving a confirmation that the task has been performed on the printer;
releasing the held print job responsive to receiving the confirmation that the task has been performed on the printer; and
transmitting the print job to the printer responsive to releasing the print job for printing.

17. The computer readable medium of claim 15 wherein the method further comprises:
determining that the printer is unavailable by detecting that the printer has encountered a paper jam.

18. The computer readable medium of claim 15 wherein the method further comprises identifying the operator instruction by:
identifying properties of the print job;
identifying a configuration of the printer;
determining that there is a difference between the properties of the print job and the configuration of the printer that will prevent the print job from printing correctly; and
generating an operator instruction based upon this difference.

19. The computer readable medium of claim 15 wherein the separator page has at least one of a page size, page color, marking ink, font size, typeface, or graphic that is different from the print job.

20. The medium of claim 15, wherein:
the operator instruction is included on the separator page as a graphical element.

* * * * *